Aug. 25, 1959  H. ABRAMSON  2,900,732
INDICATOR DEVICE FOR MEASURING INSTRUMENTS
Filed Dec. 30, 1954

INVENTOR
HUGO ABRAMSON

BY W. Bayard Jones

ATTORNEY

2,900,732

INDICATOR DEVICE FOR MEASURING INSTRUMENTS

Hugo Abramson, Eskilstuna, Sweden, assignor to Aktiebolaget C. E. Johansson, Eskilstuna, Sweden, a joint-stock company of Sweden Application December 30, 1954, Serial No. 478,700

3 Claims. (Cl. 33—172)

The present invention relates to an indicator device for measuring instruments, which comprises a frame or body in which a resilient metal band twisted about its longitudinal axis is supported, said band carrying a pointer and being connected to a measuring rod which is supported at two points along its length by supporting means, such as leaf springs or resilient membranes, in such manner that said rod is capable of moving in its longitudinal direction relatively to said body, said measuring rod extending through a supporting tube attached to and carrying said body and adapted to be secured to the frame of the measuring instrument. In indicator devices of this kind as previously proposed, one of the two supporting means for the measuring rod was located in the supporting tube, which arrangement was deemed necessary for securely guiding the rod. The arrangement entails the disadvantage, however, that the supporting tube must have a comparatively large diameter in order to provide room for the supporting spring or supporting membrane provided therein, which reduces the usefulness of the instrument.

It is a purpose of this invention to eliminate this disadvantage. According to the invention the measuring rod extends through the body of the indicator device past the twisted metal band, and its two supporting means are located one on either side of the band, taken in the longitudinal direction of the rod, the measuring rod passing freely through the supporting tube out of contact therewith. In this way the supporting tube can advantageously be made with a considerably smaller diameter than heretofore possible, without entailing any danger of the measuring rod becoming jammed in the supporting tube when the latter is clamped fast in the frame of the measuring instrument. According to the invention, the measuring rod is provided with a through opening through which the twisted metal band extends, or the twisted metal band may be positioned at one side of the measuring rod.

Figure 1:
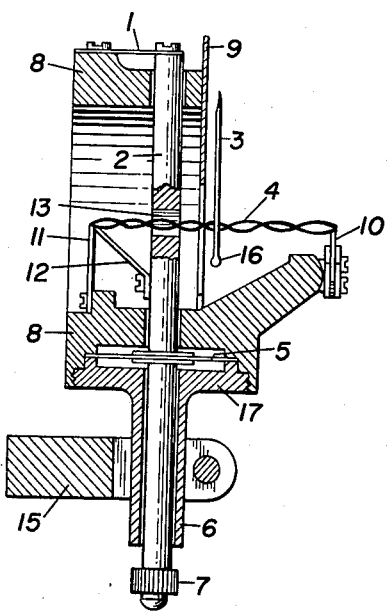
Figure 2:
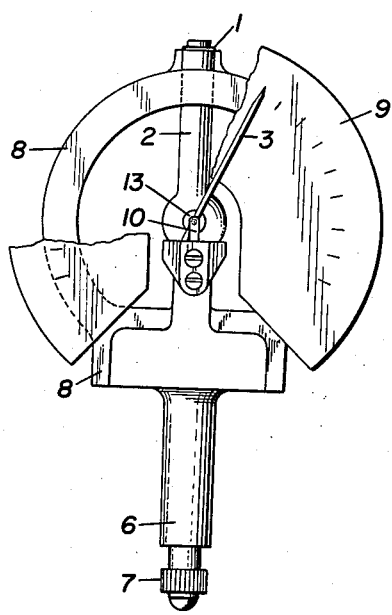
Figure 3:
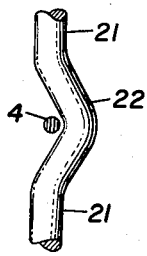

The accompanying drawing shows by way of example a constructional form of the invention and a modification thereof. Fig. 1 shows a vertical section through an indicator device according to the invention, and Fig. 2 shows a front view of the device, a portion of the scale being cut away. Fig. 3 shows a modified construction of the measuring rod.

In the drawing, 8 denotes the frame or body of the indicator device which is substantially ring-shaped and is carried by a supporting tube 6 which is adapted to be clamped in the frame of the measuring instrument, a portion 15 only of which is shown in the drawing. The indicator device comprises a resilient metal band 4 which is twisted about its longitudinal axis, and which preferably may be of the type described in the U.S. Patent No. 2,033,318, granted March 10, 1936. Said band 4 carries a very light pointer 3 which is attached to the band 4 by any suitable means, such as sealing wax, glue, or the like, and which is provided at its lower end with a small counterweight 16.

Said pointer 3 is movable over a scale 9 which is attached to the front side of the body 8. The band 4 is stretched by its ends being attached to two leaf springs 10 and 11 secured to the body 8. By means of a third leaf spring 12 one end of the band 4 is connected to a measuring plunger or rod 2 which extends downwards through the supporting tube 6 and projects beyond the lower end of said tube. Said rod 2 is provided at its lower end with a threaded sleeve 7 serving to adjust the contact surface at the lower end of the measuring rod which is to make contact with the object to be measured.

As shown in the drawing, the rod 2 extends upwards through the body 8 past the band 4. The rod 2 is supported at its upper end by a leaf spring 1 secured to the upper side of the body 8, and below the band 4 by a membrane 5 which is secured at the bottom portion of the body 8 between said body and a flange 17 at the upper end of the supporting tube 6. In this way the measuring rod 2 is capable of movement in its longitudinal direction. For this purpose, the spring 1 must, of course, have a certain minimum length, and the membrane 5 must have a certain minimum radius, in order to provide the desired freedom of movement of the measuring rod 2. Below the membrane 5 the measuring rod 2 extends freely through the supporting tube 6 the inner diameter of which is sufficiently greater than the outer diameter of the rod 2 to provide a clearance between said tube and said rod such that there is no risk of the rod 2 becoming jammed in the tube 6 when the latter is inserted and clamped fast in the frame 15 of the measuring instrument, although the supporting tube 6 has a small outside diameter and a comparatively small thickness. In the constructional form illustrated in Figs. 1 and 2, the measuring rod 2 is provided with a through transverse hole or opening 13 through which the band 4 extends. The said opening 13 must, of course, have such extension in the vertical direction that it allows the rod 2 to perform its movements without it touching the band 4. It will be observed that the leaf spring 12 which connects the measuring rod 2 with the left-hand end of the band 4, extends at an angle of approximately 45° to the rod 2 and to the band 4, and serves as a resilient strut.

Consequently, upward movement of the measuring rod 2 results in the band 4 being slightly elongated, while downward movement of the measuring rod allows the band 4 to contract. During such elongation and contraction of the band the pointer 3 is swung in opposite directions and indicates the displacement of the measuring rod on a very enlarged scale.

Fig. 3 shows a modification of the device above described in connection with Figs. 1 and 2. The figure shows a portion of the measuring rod in front view corresponding to Fig. 2. Instead of the measuring rod being provided with a through opening 13, as shown in Fig. 1, according to the construction shown in Fig. 3 the measuring rod 21 is provided with a bent portion 22 which provides a sufficient space to accommodate the twisted band 4 in a vertical plane through the axis of the rod 21 and to allow said rod to move up and down in its axial direction without touching said band 4.

It will be understood that the embodiments of the invention above described are capable of changes and modifications within the scope of the accompanying claims.

I claim:

1. In a measuring instrument of the displaceable plunger type, the combination of a body member, a displaceable plunger extending into said body member, a mounting tube attached to said body member and in which said plunger is disposed in order that measurements can be made at a location remote from the location of said body member, the inner diameter of said mounting tube being sufficiently larger than the diameter of said plunger as to provide a clearance space between the two, a twisted band type of displacement responsive means oriented in a direction substantially perpendicular to the axis of said displaceable plunger, means including strut means for converting the axial motion of said displaceable plunger to a perpendicular motion and for transmitting said perpendicular motion to said displacement responsive means for axially extending same, and means including two resilient leaf-like members for mounting said plunger for axial movement only and for preventing such transverse movement thereof as would affect the extension of said displacement responsive means whereby said displacement responsive means will be affected only by the axial movement of said plunger, said resilient mounting means being located in said body member and serving to maintain said plunger out of contact with the wall of said mounting tube so that the latter can be gripped by clamping means and hence utilized as a mounting tube without interfering with the free axial motion of said plunger.

2. In a measuring instrument of the displaceable plunger type, the combination of a body member, a displaceable plunger extending into said body member, a mounting tube attached to said body member and in which said plunger is disposed in order that measurements can be made at a location remote from the location of said body member, the inner diameter of said mounting tube being sufficiently larger than the diameter of said plunger as to form a clearance space between the two, a twisted band type of displacement responsive means oriented in a direction substantially perpendicular to and intersecting the axis of said displaceable plunger, means including a resilient strut for converting the axial motion of said displaceable plunger to a perpendicular motion and for transmitting said perpendicular motion to said displacement responsive means for axially extending same, and means including a leaf spring and a membrane located one on either side of said resilient strut and anchored to said body member and said plunger for mounting said plunger for axial movement only and for preventing such transverse movement thereof as would affect the extension of said displacement responsive means whereby said displacement responsive means will be affected only by the axial movement of said plunger, said resilient mounting means serving to maintain said plunger out of contact with the wall of said mounting tube so that the latter can be gripped by clamping means and hence utilized as a mounting tube without interfering with the free axial motion of said plunger, and said plunger having an offset portion providing a space to accommodate said displacement responsive means in the vicinity of the point of intersection of the latter with the axis of said plunger.

3. An indicator device for measuring instruments of the character described, comprising in combination a substantially ring-shaped body, a resilient metal band twisted about its longitudinal axis, resilient means carried by said body and attached to the ends of said metal band to support it in a stretched condition, a pointer attached to and supported by said metal band, a displaceable rod disposed perpendicularly to said axis of said band, resilient supporting means carried by said body and supporting said measuring rod to permit a restricted movement of the rod in its longitudinal direction only, said movement being transverse to the direction of said metal band, said rod supporting means being attached to said measuring rod at two points along its length located on opposite sides of said metal band taken in the longitudinal direction of said rod, a resilient strut forming an angle of approximately 45° to said rod and said twisted metal band to transform longitudinal motion of said rod into motion of said end of the metal band in the axial direction thereof to effect a change in tension of said band, and, a supporting tube attached to said body and surrounding a portion of said measuring rod projecting through the tube, said tube having an internal diameter sufficiently great as to provide an intermediate clearance space between its inner surface and said portion of said measuring rod.

References Cited in the file of this patent

UNITED STATES PATENTS

| | | |
|---|---|---|
| 1,076,682 | Lucas | Oct. 28, 1913 |
| 1,891,196 | Aldeborgh et al. | Dec. 13, 1932 |
| 2,015,986 | Aldeborgh et al. | Oct. 1, 1935 |
| 2,033,318 | Abramson | Mar. 10, 1936 |
| 2,687,642 | Livermont | Aug. 31, 1954 |

FOREIGN PATENTS

| | | |
|---|---|---|
| 253,521 | Germany | Nov. 11, 1912 |
| 642,723 | Great Britain | Sept. 13, 1950 |